United States Patent [19]

Guillot-Munoz

[11] 4,010,880
[45] Mar. 8, 1977

[54] APPLIANCE FOR THE SECURE TRANSPORT OF DOMESTIC ANIMALS SUCH AS DOGS AND CATS

[76] Inventor: Maria Guillot-Munoz, 60 rue Mazarine, Paris, France, 75006

[22] Filed: Aug. 4, 1975

[21] Appl. No.: 601,285

[30] Foreign Application Priority Data

Aug. 13, 1974 France .............................. 74.27981

[52] U.S. Cl. .............................. 224/42.42 A; 119/1; 119/96; 5/94; 224/42.43
[51] Int. Cl.² ........................................... B60R 7/00
[58] Field of Search .................... 119/1, 96, 19; 224/42.42, 42.43, 42.42 R, 42.42 A; 5/94, 118

[56] References Cited

UNITED STATES PATENTS

| | | | |
|---|---|---|---|
| 1,363,667 | 12/1920 | Mahr | 5/94 |
| 2,499,103 | 2/1950 | Love | 224/42.43 |
| 3,310,034 | 3/1967 | Dishart | 119/96 |
| 3,574,872 | 4/1971 | Mattila | 5/94 |
| 3,735,430 | 5/1973 | Platz | 5/94 |

*Primary Examiner*—Hugh R. Chamblee
*Attorney, Agent, or Firm*—Mason, Fenwick & Lawrence

[57] ABSTRACT

An animal carrier for mounting on the seat of an automobile or the like is disclosed comprising upper and lower hoops enclosed in flexible material defining a bag-like container in which the animal is positioned including means permitting connection to a harness for retaining the animal in the device; another embodiment employs articulated frame means connecting the upper hoop to a medial hoop fixedly connected to the lower hoop to provide a collapsible framework for the construction.

10 Claims, 6 Drawing Figures

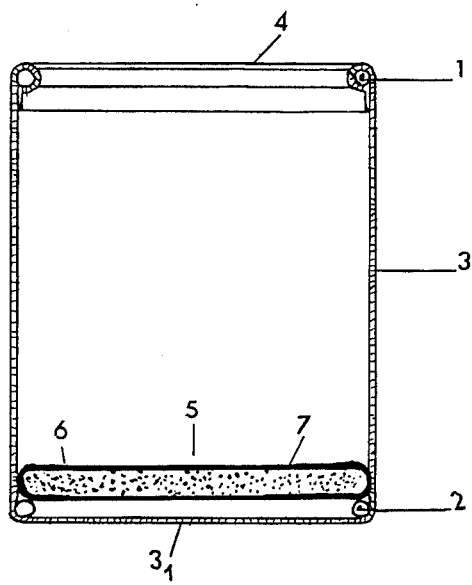
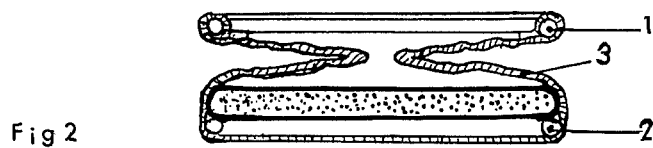
Fig 1
Fig 2

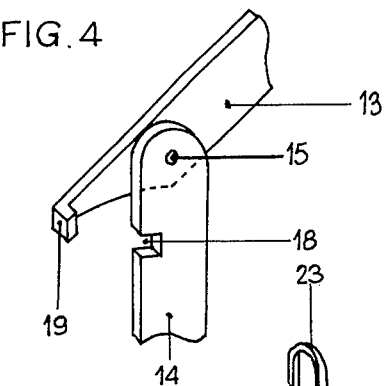
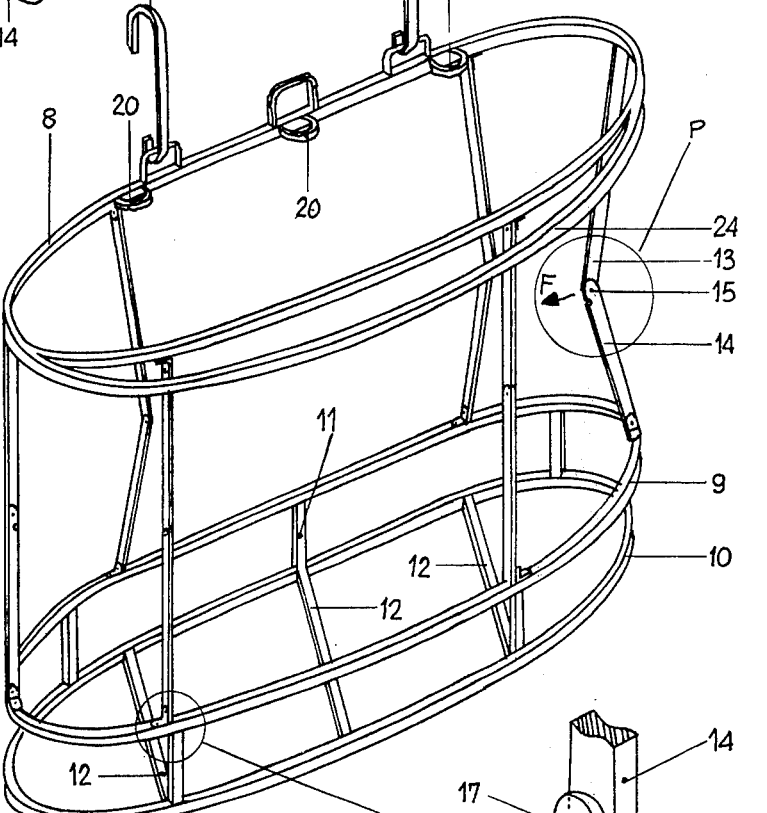
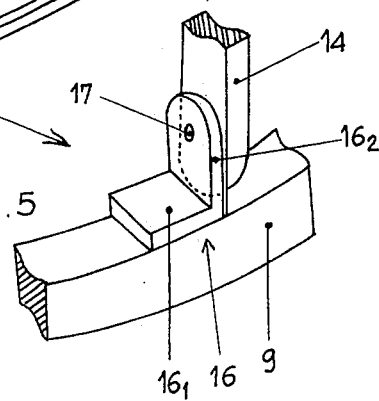

APPLIANCE FOR THE SECURE TRANSPORT OF DOMESTIC ANIMALS SUCH AS DOGS AND CATS

The invention is a security apparatus for the transportation, particularly in automobiles, of domestic animals, especially dogs, cats, monkeys, etc.

The transportation of animals, even domesticated ones, in automobiles poses serious problems. At a time when the laws of the road are tightening up in order to reduce as much as possible the mortality rate caused by automobile accidents, the transportation of animals remains the cause of many accidents; and for this reason, constitutes a real danger. Indeed, it is often the case that an animal that is usually completely harmless suddenly becomes vicious and aggressive when being transported. This is particularly the case if the trip is long, and if heat and hunger add to the animal's impatience.

The animal's owner rarely considers this possibility, because "at home", the animal is docile and affectionate. But the best specialists and experts in dealing with these questions are formal in their declarations: an animal, even as a human being, can undergo character disorders in an automobile, and can become very aggressive. This phenomenon has often been noticed with drivers, and can equally be found in animals, who, not having the gift of reason, become capable of strange behavior, particularly that of jumping around on the car seats, and even jumping from the car should it be a convertible.

Even should the action of the animal not reach these extremes, even an animal who remains docile can provoke an accident. It is not rare that a dog or cat slip beneath the seat and place itself near the control peddles of the vehicle. Should this happen, the driver, caught off guard, could have an abrupt reaction, and finish by having an accident.

The aim of this invention is to avoid such a situation, and consists of a device which enables the animal to travel comfortably, while at the same time, not being a menace to the security of fellow passengers. In addition, this apparatus is extremely effective from a hygienic point of view, because it provides for a method of coping with the inevitable excretions of the animal.

The invention is therefore a security device for animals, such as dogs and cats, when travelling in motor vehicles. It consists of a collapsable basket, equipped with an adaptable system of securing the animal, and is also fitted with fastenings allowing its suspension.

Characteristic of this invention, the basket is made of a light and padded frame.

According to the best method of construction, the frame consists of two rigid hoops which form the upper and lower edges of the basket, the padded fabric being shaped to cover this frame, either being held taut by the weight of the animal, thus forming the basket, or kept flat by uniting the two hoops, one on top of the other, to facilitate storage.

A security device according to the invention is presented as an example with unlimited variations possible, in the designs attached, in which:

FIG. 1 is a cross section diagram in which the basket is open.

FIG. 2 is a diagram of the basket illustrated in FIG. 1 in a folded position.

FIG. 3 is a diagram, in perspective, of the hinged frame of the basket according to the second method of construction.

FIG. 4 is an enlarged diagram of the joint of two small rods as illustrated in FIG. 3 in the circle P.

FIG. 5 is an enlarged diagram, in perspective, of a detail of the assembly of the two small rods in their appropriate hoops.

Figure 6:
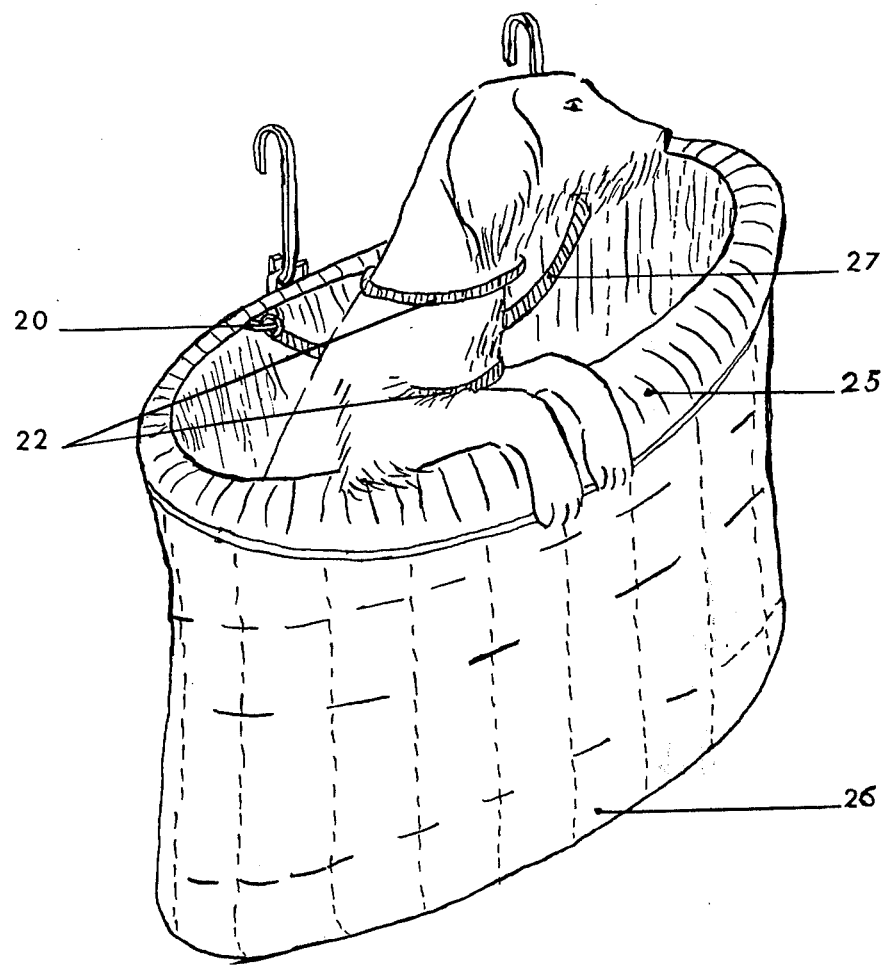
FIG. 6 is a diagram, in perspective, of the padded basket.

This security device, which ensures calm and comfortable travel for animals, is composed mainly of a basket, attachments and harness to hold the animal in the basket, and fittings allowing the basket to be suspended from a fixed point, for example the back of a car seat.

This basket can be made in various shapes and the two examples shown on the drawings attached are given solely to facilitate the comprehension of the invention.

This basket, which is fairly large in volume, should preferably be constructed with a folding mechanism, which enables it to be carried either open while in use, or to be folded for easy storage. In the illustration of FIG. 1 this basket consists of a light and simple frame, with the padding making up its real volume. This framework is, according to the first method of construction, composed of two hoops 1 and 2 defining the upper and lower edges of the basket, with the hoops preferably inserted in hems in the padding 3. This padding is presented in the form of tubular sides and a bottom $3_1$ to define a bag-like member. This basket of variable dimensions is held rigid at its base by the hoop 2 which can be either fitted into the padding $3_1$ or inserted into a hem not shown. The hoop 1 is inserted into the hem 4 on the top of the basket. The comfort of the basket is assured by a mattress 5, consisting of a padding 6 of expanded foam rubber with a cover 7 which is detachable and washable. The materials from which the hoops 1 and 2, forming the upper and lower edges of the basket are made, or the material used for the lining is not specified and does not directly influence the efficiency of the apparatus. Thus the hoops 1 and 2, here presented in light tubing, can be either made of plastic or metal; while the lining can be in a basic linen fabric, in leather, or a vinyl or quilted to produce a more luxurious effect. In the latter case the lining needs to be double thickness in order to insert layers of expanded foam, such as polyurethan between them. It is possible to decorate this lining with top-stitching, designs, or transfers (decals). One could also decorate this lining with a color motif to match the interior of the vehicle or even as an accessory to go with clothes, like a hand bag. With this kind of finish it is recommandable, bearing in mind the simplicity of the elements used to construct the basket, to make the lining detachable, so that it could be easily changed to match different color schemes. In this case, the hem 4 in which the hoop 1 is inserted, should be easily opened with the release of the hoop. This effect can be obtained with a fastening such as Velcro (zipper).

In the illustration in FIG. 1 the hamper is in an open position, the tautness of the lining being obtained by the weight of the animal. The folding of the basket as illustrated in FIG. 2 is achieved by bringing together the two hoops 1 and 2 with a fold in the middle (lining 3) enabling easy storage.

According to a second more elaborate method of construction as illustrated in FIG. 3, the frame consists of three hoops 8, 9 and 10 of the same proportions, being superimposed to create the structure of the basket. The hoops 9 and 10 are held rigidly together by welded cross braces 11 evenly distributed around the perimeter of the hoops. The hoop 10 constitutes the bottom rim of the basket holding the welded reinforcements 12 to avoid deformation. The junction of the hoops 8 and 9 is produced by the connection of several pairs of hinged bars, each of these pairs are composed of two small bars 13, 14 which are each attached to its respective hoop and are joined together by a pivotal axis (hinge) 15. Each small bar is attached to its respective hoop FIG. 5 by a right angle support 16 and a pivotal axis 17. These supports are in the form of a right angle and one side $16_1$ is welded to the hoop while the other angle $16_2$ is connected to a small bar 14 by the axis 17. The lower half of the bars 14 have a small notch 18 FIG. 4 while the upper half of the bar 13 has at its extremity a bar hook 19 designed to lock into place when the bars are aligned at 180°thus forming a lock which prevents the bars from pivoting farther than a 180° position. This folding structure thus permits the basket to be carried in an open position such as shown in FIG. 3, or in a folded position by tilting the pivotal axis 15 in the direction of the arrow F. The folding of the bars has the effect of progressively reducing the distance separating the hoops 8 and 9 until they are practically overlapping, reducing the volume of the framework to its minimum.

The basket is brought from the folded position to its open position simply by pulling the hoop 8 in a vertical direction, bringing the bars progressively to an alignment of 180°, as shown in FIG. 3. The hoop 8 composing the superior edge of the basket can have one or several rings 20 welded on, which serves as the point of attachment for the harness 21, which is composed of straps 22 and designed to hold the animal in the basket. FIG. 6. This harness is composed of straps 22 of adjustable length, to adapt to the size of the animal and to hold him in the basket in a way that he can't jump out.

This same hoop 8 also has two movable hooks 23 permitting the basket to be hung from a fixed point, in particular on the back of a car seat. Also, this type of suspension permits, with the aid of the appropriate hooks, to hang the basket in other places, for example: on the back of a chair in a public place.

As shown in FIGS. 1 and 2, the lining covering this structure can be made in all types of materials, and in particular a cover on the cushion in a vinyl material which has the ability to cover completely the folding framework.

Finally, to improve the conditions of travelling for the animal, the hoop 8 has an extra bar 24 curved to have the same tangent as said hoop 8, this bar forms a padded ledge 25 that the animal can put his paws or head on, and being at the same level as the driver, he can look at the countryside without clawing at the windows. Here again, the decoration can be anything without getting away from the basic design of the invention. The cushion 26 forming the bottom of the basket, can be made of foam rubber with a removable cover for easy cleaning.

The harness is designed to hold the animal and is made up of straps 22 that cross on back of the animal, or across the chest, these straps are of adjustable length, capable of being adapted to animals of different sizes. This harness has one or several rings allowing it to be connected by other straps or lines 27 to the rings 20 of the basket. In this way the animal isn't hindered from sleeping in the bottom of the basket, but at the same time, he can't get out of the basket since the length of the straps 27 can be adjusted to avoid this possibility, while at the same time allowing the animal a large freedom of movement.

As stated before, the nature of the material used for the framework as well as the material used for the lining can be of any type without getting away from the idea of the invention. It would be a good idea, in order to make the basket lighter, to build the folding framework in a plastic material which will facilitate the fabrication.

This device presents the advantage of being able to isolate the animal in such a way so as to hinder him from disturbing the driver, and in consequence, menace the security of his fellow passengers. Also the fact that the animal stays in the basket during the trip, eliminates all possibilities of stains or dirtiness.

Of course, the invention is not limited to just the two examples described above. From them, one can imagine other forms and variations of construction without getting away from the idea of the invention.

What I claim is:

1. An animal supporting and restraining device for providing the secure transportation of domestic animals such as dogs and cats on a passenger seat comprising a collapsible basket including first and second frame hoops each of closed configuration, a bag-like member consisting of a cover of flexible material fixed over said rigid hoops and having a side portion and a bottom portion, ring means fixedly connected to said upper hoop, strap means connected to said ring means and connectable to an animal carried within the confines of said bag-like member for retaining an animal therein, a medial third hoop, brace means connecting said third hoop to said lower hoop for maintaining said third hoop in spaced parallel relationship above said lower hoop and a plurality of pairs of hinged bars connecting said upper hoop to said third hoop, each pair of hinged bars comprising an upper bar and a lower bar, upper pivot means connecting the upper end of each of said upper bars to said upper hoop, medial pivot means connecting the lower end of each of said upper bars to the upper end of an associated lower bar and lower pivot means connecting the lower ends of each of said lower bars to said third hoop and movable hook means connected to said upper hook for permitting the support of said device on the back of an automobile seat or the like.

2. The invention of claim 1 additionally including cooperating movement limiting means for preventing relative pivotal movement of said upper and lower bars about said medial pivot means in a first direction substantially beyond linear alignment of said upper and lower bars.

3. The invention of claim 2 wherein said cooperating movement limiting means comprises a bar hook on said upper bar extending outwardly therefrom and a slot on said lower bar receiving said bar hook when the upper and lower bars are in general alignment.

4. The invention of claim 1 additionally including a reinforcing frame means extending across the interior of said lower hoop.

5. The invention of claim 4 additionally including cooperating movement limiting means for preventing relative pivotal movement of said upper and lower bars about said medial pivot means in a first direction substantially beyond linear alignment of said upper and lower bars.

6. The invention of claim 5 wherein said cooperating movement limiting means comprises a bar hook on said upper bar extending outwardly therefrom and a slot on said lower bar receiving said bar hook when the upper and lower bars are in general alignment.

7. The invention of claim 1 additionally including means defining a padded ledge about said upper hoop.

8. The invention of claim 7 additionally including cooperative movement limiting means for preventing relative pivotal movement of said upper and lower bars about said medial pivot means in a first direction substantially beyond linear alignment of said upper and lower bars.

9. The invention of claim 8 wherein said cooperating movement limiting means comprises a bar hook on said upper bar extending outwardly therefrom and a slot on said lower bar receiving said bar hook when the upper and lower bars are in general alignment.

10. The invention of claim 9 additionally including a reinforcing frame means extending across the interior of said lower hoop.

* * * * *